US005079335A

United States Patent [19]

See

[11] Patent Number: 5,079,335

[45] Date of Patent: * Jan. 7, 1992

[54] PROCESS FOR PREPARING A COLOR-IMPROVED THERMOPLASTIC POLYARYLATE POLYMER

[75] Inventor: Benito See, Belle Mead, N.J.

[73] Assignee: Amoco Corporation, Chicago, Ill.

[ * ] Notice: The portion of the term of this patent subsequent to Mar. 27, 2001 has been disclaimed.

[21] Appl. No.: 523,994

[22] Filed: May 16, 1990

Related U.S. Application Data

[60] Continuation of Ser. No. 250,934, Sep. 29, 1988, abandoned, which is a continuation of Ser. No. 651,807, Sep. 18, 1984, abandoned, which is a continuation-in-part of Ser. No. 593,743, Mar. 27, 1984, Pat. No. 4,520,168, which is a division of Ser. No. 393,556, Jun. 30, 1982, Pat. No. 4,439,586.

[51] Int. Cl.[5] ........................ C08F 8/00; C08L 67/00; C08G 63/00; C08G 69/00

[52] U.S. Cl. .................................... 528/271; 528/176; 528/272

[58] Field of Search ................. 528/271, 272; 525/169

[56] References Cited

U.S. PATENT DOCUMENTS 4,978,739 12/1990 Amone et al. ...................... 528/271

*Primary Examiner*—Harold D. Anderson
*Assistant Examiner*—T. Mosley
*Attorney, Agent, or Firm*—Janice M. McLain; William H. Magidson; Ralph C. Medhurst

[57] ABSTRACT

Described herein is an improved process for preparing an ester derivative of a dihydric phenol by reacting the dihydric phenol with an acid anhydride wherein the improvement comprises carrying out the reaction in the presence of a particular adsorbent. Also described herein is a method of treating an ester derivative of a dihydric phenol with a particular adsorbent.

1 Claim, No Drawings

PROCESS FOR PREPARING A COLOR-IMPROVED THERMOPLASTIC POLYARYLATE POLYMER

This is a continuation of application Ser. No. 250,934 filed Sept. 29, 1988, now abandoned, which is a continuation of application Ser. No. 651,807 filed Sept. 18, 1984, now abandoned, which is in turn a continuation-in-part of application Ser. No. 593,743 filed Mar. 27, 1984, issued May 28, 1985, as U.S. Pat. No. 4,520,168 which is a division of application Ser. No. 393,556 filed June 30, 1982, now U.S. Pat. No. 4,439,586 issued Mar. 27, 1984.

BACKGROUND OF THE INVENTION

This invention is directed to an improved process for preparing an ester derivative of a dihydric phenol by reacting a dihydric phenol with an acid anhydride, wherein the improvement comprises carrying out the reaction in the presence of a particular adsorbent selected from silica gel, activated charcoal or a molecular sieve. Also, this invention is directed to treating the ester derivative of the dihydric phenol after its formation with said adsorbents.

Polyarylates are polyesters derived from a dihydric phenol, particularly 2,2-bis(4-hydroxyphenyl)propane, also identified as bisphenol-A, and an aromatic dicarboxylic acid, particularly mixtures of terephthalic and isophthalic acids. These polyarylates are high temperature, high performance thermoplastic polymers which have a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid(s) to form a polyarylate.

The use of a high purity, low color diester derivative of a dihydric phenol monomer is important in making a low color, stable polyarylate polymer. Conventionally, the purification of such monomers included dissolving the monomers in a suitable solvent, usually with an adsorbent such as activated charcoal and re-crystallizing the product from said solvent. However, such a purification process is complex and uneconomical due to the dissolution and crystallization steps and the large amount of solvent involved.

There are extensive literature references which show the chemical reactivity of charcoal and other adsorbents as in Zechmeister et al, J. Am. Chem. Soc., 64, 1922 (1942). Some charcoals are known oxidizing agents at higher temperatures which would increase the color of most polymers or monomers as discussed in E. Ledoux, "Vapor Adsorption, Industrial Applications and Competing Processes", Chemical Pub. Co., Brooklyn, 1945. In addition, physical adsorption decreases with increasing temperature. The use of the adsorbents of this invention to improve the color of diester derivatives of dihydric phenols in the diacetate process for preparing polyarylates is unexpected since the adsorbent is effective in producing a low color product even though the reaction to produce the diester derivatives is conducted at elevated temperatures.

In the present invention an improved process has been found where high quality low color diester derivatives of dihydric phenols are formed. The improvement comprises the use of a particular adsorbent in the process of preparing an ester derivative of a dihydric phenol from a dihydric phenol and an acid anhydride. No dissolution or re-crystallization is required in the present process. The diester derivative product produced by the process of this invention is used to make very low color, stable polyarylates.

THE INVENTION

An improved process for preparing an ester derivative of a dihydric phenol by reacting a dihydric phenol with an acid anhydride, the improvement comprising carrying out the reaction in the presence of a particular adsorbent. Also, this invention is directed to treating the ester derivative of the dihydric phenol after its formation with said adsorbents.

The adsorbents which are used herein include silica gel, activated charcoal derived from wood, paper pulp waste and coconut, molecular sieves, i.e., alumino silicates, and the like.

The adsorbent is generally utilized in amounts of from about 0.02 to about 2, preferably from about 0.01 to about 0.3 weight percent, based on the weight of the reaction mixture. Higher amounts of the adsorbent may be used when it is added to the reaction, but this is generally not economical and not necessary to achieve a product which is low in color. Of course, when the product is passed through a bed of the adsorbent, a large quantity of the adsorbent is used in relation to the reaction mixture.

The adsorbents may be added during the reaction or to the diester derivative after it is formed. After the diester derivative is formed it can be passed through a fixed bed of the adsorbent.

The dihydric phenols which may be used herein have the following formula

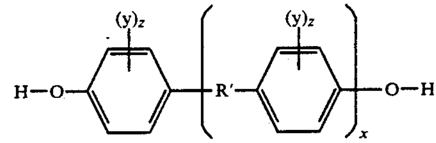

wherein y is independently selected from alkyl groups of 1 to 4 carbon atoms, chlorine or bromine, z independently has a value of from 0 to 4, inclusive, and R' is independently selected from a direct bond, a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$ and CO, and where x is 0 or 1.

The dihydric phenols that may be used in this invention include the following:

2,2-bis-(4-hydroxyphenyl)propane,
bis-(3-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane, 2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxydiphenyl)ether,
4,4'-(dihydroxydiphenyl)sulfide,
4,4'-(dihydroxydiphenyl)sulfone,
4,4'-(dihydroxydiphenyl)sulfoxide,
4,4'-dihydroxybenzophenone,
4,4'-dihydroxybiphenyl, and hydroquinone.

The acid anhydride is derived from acids containing from 2 to 8 carbon atoms. The preferred acid anhydride is acetic anhydride.

An acid catalyst may be used in the process. The acids which may be used herein have a pKa less than about 2.5 and preferably below 0 as measured in water at about 25° C. These acids include hydrochloric acid, sulfuric acid, trifluoromethanesulfonic acid, phosphoric acid, oxalic acid and the like.

These acid catalysts are used in amounts of from about 0.04 to about 0.85 and preferably from about 0.05 to about 0.10 moles per million grams of reaction mixture. The reaction mixture includes the reactants and optionally, the solvent.

The reaction of the dihydric phenol and acid anhydride is performed with these reactants present in the ratio of from about 1:1 to as high as 1:5, preferably from about 1:1.5 to about 1:1.25, hydroxyl group:acid anhydride.

The reaction of the dihydric phenol and acid anhydride is carried out at a temperature of from about 80° to about 180° C. and preferably from about 110° to about 150° C. The process is generally conducted in an inert atmosphere (such as argon or nitrogen). The process is preferably carried out at atmospheric pressure although higher and lower pressures may be used. Obviously, at pressures higher than atmospheric pressure, higher temperatures will result.

The process is generally carried out for about 0.5 to about 4 and preferably from 1 to about 2 hours.

The process is preferably conducted in the absence of solvent although, if desired, a solvent may be used. The use of a solvent will increase the costs of the process. The solvents include aromatics and haloaromatics, particularly xylene, chlorobenzene, dichlorobenzene, and the like. The solvent preferably has a boiling point at the operating temperature of the reaction. The amount of solvent can be from about 20 to about 50 percent of the reaction mixture.

EXAMPLES

The following examples serve to give specific illustrations of the practice of this invention but they are not intended in any way to limit the scope of this invention.

CONTROL

Into an agitated glass vessel was charged 100 gms bisphenol A and 116 gms acetic anhydride. The mixture was heated to reflux (about 138° C.) at atmospheric pressure and maintained at this condition for 4 hours. Vacuum was then applied to distill off by-product acetic acid and unreacted acetic anhydride. The crude bisphenol A diacetate (BDA) produced was held under vacuum at about 150° C. for 45 minutes. Twenty seven grams of acetic acid was added and the vacuum distillation procedure repeated. The crude BDA was dissolved in methylene chloride to make a 40% solution and % light transmittance was measured with a Fisher electrophotometer. This was then related to APHA color which in this case has a value of 27.

EXAMPLE 1

The procedure in the control was exactly repeated except 0.65 gms of DARCO G-60 powdered activated charcoal (DARCO G-60, 200 Mesh obtained from Matheson, Coleman and Bell) was added with the reactants. This charcoal was then removed from the product by filtration. The APHA color of the BDA thus produced was 1.

EXAMPLE 2

The procedure in Example 1 was exactly repeated except that 0.16 gms of the activated charcoal was added with the reactants. The APHA color of the BDA was 3.

EXAMPLE 3

The procedure in Example 1 was exactly repeated except that 0.51 gms of granular activated charcoal (Nuchar HW-40 obtained from Westvaco Chemical Division) was added with the reactants. The APHA color of the BDA was 8.

EXAMPLE 4

The procedure in Example 1 was exactly repeated except 0.21 gms of the DARCO G-60 powdered activated charcoal was added after the 4-hour reaction. The APHA color of the BDA was 8.

EXAMPLE 5

Molten crude BDA was pumped through a fixed bed of granulated activated charcoal at the rate of 2 ml/minute. The charcoal bed was packed inside a jacketed column about 13 mm in diameter and 50 cm long. The column and the crude BDA feed were maintained at about 110° C. The treated BDA was collected and its APHA color measured. The average value was 11.

EXAMPLE 6

Bisphenol A diacetate was prepared and tested as described in the Control. The APHA value was 118. The bisphenol A diacetate was heated for ½ hour at 135° C. with 2 percent of silica gel under a nitrogen atmosphere. The APHA color was measured. The average value was 65.

EXAMPLE 7

Bisphenol A diacetate was prepared and tested as described in the Control. The APHA value was 85. The bisphenol A diacetate was heated for ½ hour at 135° C. with 4 percent of 5A molecular sieves (obtained from Union Carbide Corporation). The APHA color was measured. The average value was 50.

EXAMPLE 8

Bisphenol A diacetate was prepared and tested as described in the Control. The APHA value was 83. The bisphenol A diacetate was heated for ½ hour at 135° C. with 0.5 percent of the activated charcoal of Example 1. The APHA color was measured. The average value was 4.

What is claimed is:

1. A process for preparing a color-improved thermoplastic polyarylate polymer which comprises the following steps:

(a) reacting acid anhydride derived from acid containing from 2 to 8 carbon atoms with at least one dihydric phenol in sufficient molar proportions to form the corresponding diester in the presence of from about 0.2 to about 2.0 weight percent based on the weight of the reaction mixture of an adsorbent selected from silica gel, activated charcoal or a molecular sieve; and (b) reacting said diester with at least one aromatic dicarboxylic acid at a temperature sufficient to form the polyarylate.

* * * * *